United States Patent
S et al.

(10) Patent No.: US 12,373,513 B2
(45) Date of Patent: Jul. 29, 2025

(54) SCREEN CAPTURE HINT AND AUTOMATED SCREEN CAPTURE

(71) Applicant: SAP SE, Walldorf (DE)

(72) Inventors: Chandrakanth S, Walldorf (DE); Sudha Karanam Narasimha Murthy, Walldorf (DE); Sharmika Parmar, Walldorf (DE); Suvajit Dutta, Walldorf (DE); Vinay Kumar, Bangalore (IN); Satyadeep Kumar Dey, Bangalore (IN); Mithilesh Kumar Singh, Ara (IN)

(73) Assignee: SAP SE, Walldorf (DE)

( * ) Notice: Subject to any disclaimer, the term of this patent is extended or adjusted under 35 U.S.C. 154(b) by 115 days.

(21) Appl. No.: 17/550,095

(22) Filed: Dec. 14, 2021

(65) Prior Publication Data

US 2023/0185869 A1    Jun. 15, 2023

(51) Int. Cl.
*G06F 9/451* (2018.01)
*G06F 3/0481* (2022.01)
*G06F 16/951* (2019.01)
*G06F 16/958* (2019.01)

(52) U.S. Cl.
CPC .......... *G06F 16/986* (2019.01); *G06F 3/0481* (2013.01); *G06F 9/453* (2018.02); *G06F 16/951* (2019.01)

(58) Field of Classification Search
CPC ...... G06F 16/986; G06F 3/0481; G06F 9/453; G06F 16/951
See application file for complete search history.

(56) References Cited

U.S. PATENT DOCUMENTS

| | | | |
|---|---|---|---|
| 8,612,806 B2* | 12/2013 | Rossi | G06F 11/263 714/48 |
| 8,682,636 B2* | 3/2014 | Bischof | G06F 11/3664 703/21 |
| 10,430,212 B1* | 10/2019 | Bekmambetov | G06F 16/958 |
| 11,200,073 B1* | 12/2021 | Voicu | G06F 3/0482 |
| 2008/0082629 A1* | 4/2008 | Puthiyaveettil | G06F 16/954 709/217 |
| 2009/0100372 A1* | 4/2009 | Lauridsen | G06F 16/958 715/781 |
| 2010/0287013 A1* | 11/2010 | Hauser | G06Q 10/06375 705/7.37 |

(Continued)

*Primary Examiner* — Matthew Ell
*Assistant Examiner* — Alvaro R Calderon, IV
(74) *Attorney, Agent, or Firm* — Buckley, Maschoff & Talwalkar LLC

(57) ABSTRACT

Provided are systems and methods for automatically detecting a change in screen content and generating a hint message in response. As another example, the system may auto-capture the detected change in the screen content instead of or in addition to the hint message. In one example, a method may include capturing user interface metadata of content being displayed by a client-side of the software application, activating a recorder that is configured to record events transmitted between the client-side and a server-side of the software application, receiving updated user interface metadata based on a user interaction on the client-side of the software application, determining that user interface content has changed based on a comparison of the captured user interface metadata to the updated user interface metadata, and displaying a hint message via the user interface of the client-side of the software application.

20 Claims, 9 Drawing Sheets

(56) References Cited

U.S. PATENT DOCUMENTS

| | | | |
|---|---|---|---|
| 2012/0010995 A1* | 1/2012 | Skirpa | G06F 16/9577 705/14.49 |
| 2013/0159784 A1* | 6/2013 | Rossi | G06F 11/3684 714/47.1 |
| 2013/0332813 A1* | 12/2013 | Heinrich | G06F 9/54 709/224 |
| 2014/0067854 A1* | 3/2014 | Simon | G06F 16/951 707/769 |
| 2014/0132571 A1* | 5/2014 | Zeng | G06F 11/3688 345/178 |
| 2015/0161219 A1* | 6/2015 | Bendiabdallah | G06F 16/907 707/722 |
| 2015/0242538 A1* | 8/2015 | Bendiabdallah | G06F 16/958 707/738 |
| 2015/0339213 A1* | 11/2015 | Lee | G06F 3/0484 717/125 |
| 2016/0335353 A1* | 11/2016 | Gianos | G06F 16/951 |
| 2018/0322129 A1* | 11/2018 | Kern | G06F 3/048 |
| 2019/0042397 A1* | 2/2019 | Vignesh R | G06F 11/3692 |
| 2019/0347067 A1* | 11/2019 | Jolfaei | G06F 3/167 |
| 2020/0050983 A1* | 2/2020 | Balasubramanian | G06F 11/3423 |
| 2020/0142816 A1* | 5/2020 | R | G06F 11/3688 |
| 2020/0226052 A1* | 7/2020 | Fernandes | G06F 16/955 |
| 2020/0249964 A1* | 8/2020 | Fernandes | G06F 9/451 |
| 2021/0357939 A1* | 11/2021 | Davis | G06F 9/451 |
| 2021/0390011 A1* | 12/2021 | Cser | G06F 11/3692 |
| 2022/0350858 A1* | 11/2022 | Walia | G06F 16/9577 |
| 2022/0350860 A1* | 11/2022 | Walia | G06F 40/143 |
| 2022/0374338 A1* | 11/2022 | Brown | G06F 11/3438 |

\* cited by examiner

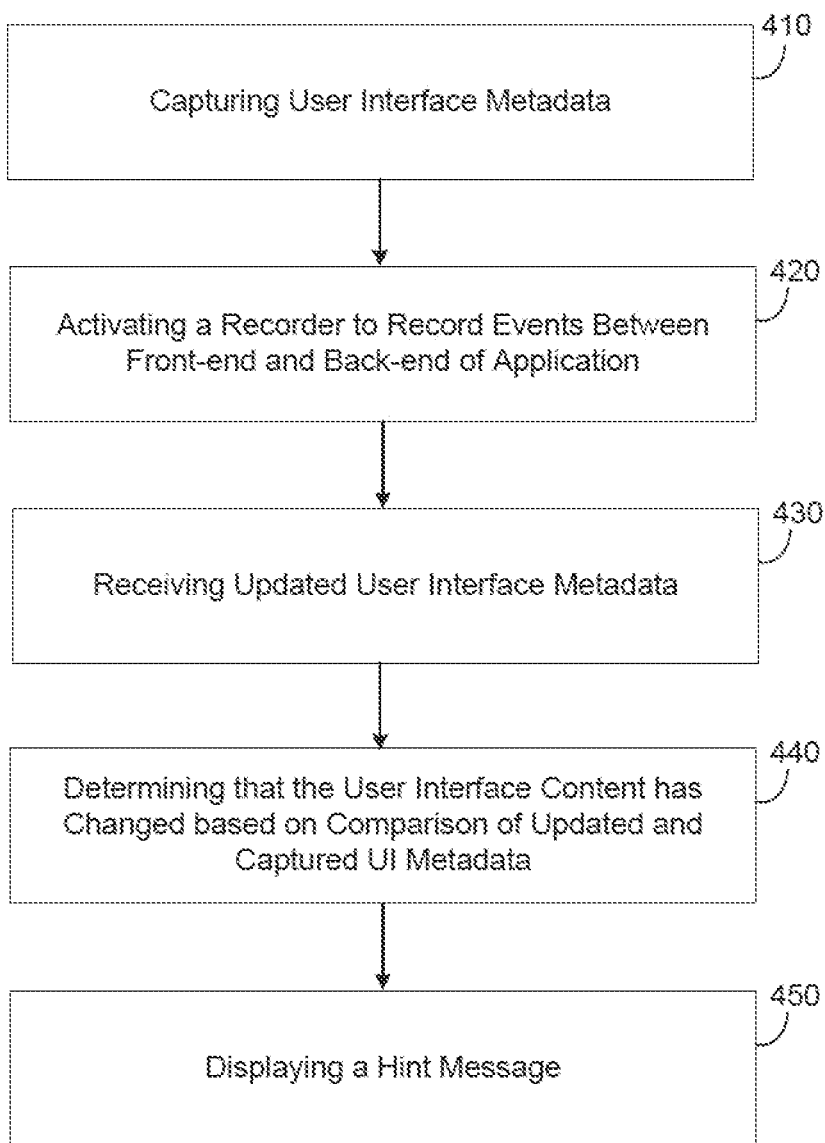

SCREEN CAPTURE HINT AND AUTOMATED SCREEN CAPTURE

BACKGROUND

WebGUI, also referred to as WEBGUI and SAP GUI for hypertext markup language (HTML), is an implementation model for screen-based software applications that allows users to run dialog transactions directly in a web browser. WebGUI may dynamically provide user interfaces/screens in the web browser for transactional processing such as entering data into fields, opening pages, moving a cursor, clicking buttons, checking boxes, and the like. WebGUI relies on a client-server architecture in which a client-side or front-end of an application communicates with a server-side or back-end of the application to render content within a graphical user interface at the front-end.

Recently, robotic processing automation (RPA) has gained attention for its ability to create bot programs that can perform automated user interface actions on a user interface of a software application (e.g., a WebGUI-based application, etc.) in place of a user. For example, a bot program can automatically read data, enter the data, submit data, check boxes and buttons, make other selections, open pages, click on links, and the like. However, creating such bot programs typically requires a significant amount of manual intervention by a user.

BRIEF DESCRIPTION OF THE DRAWINGS

Features and advantages of the example embodiments, and the manner in which the same are accomplished, will become more readily apparent with reference to the following detailed description while taken in conjunction with the accompanying drawings.

FIG. 4 is a diagram illustrating a method of displaying a hint message in accordance with an example embodiment.

DETAILED DESCRIPTION

Figure 1A:
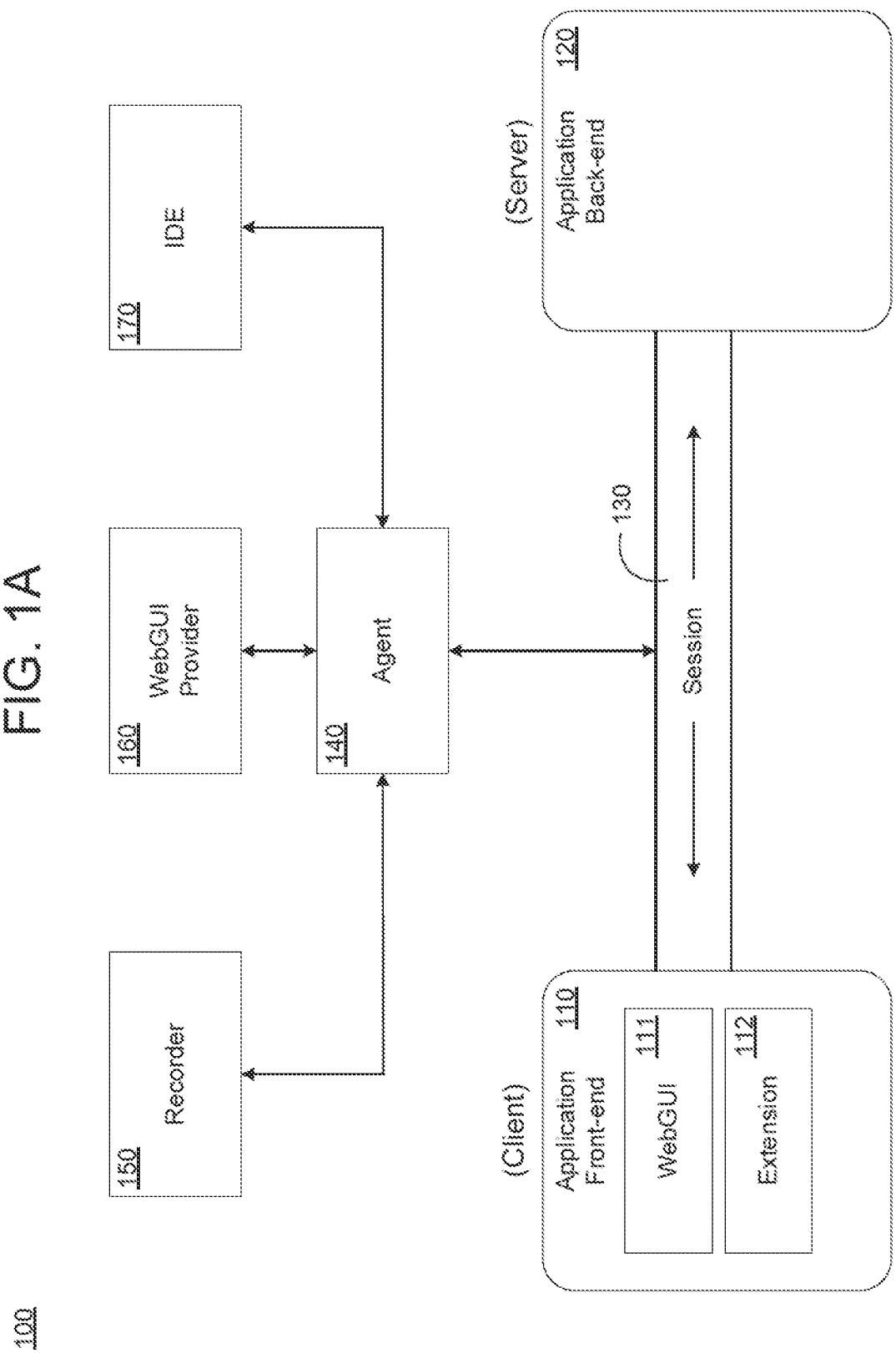
FIG. 1A is a diagram illustrating a computing environment for application development in accordance with an example embodiment.

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

Robotic processing automation (RPA) has gained attention for its ability to create bot programs that can perform automated user interface actions on a user interface of a software application (e.g., a WebGUI-based application, etc.) in place of a user. For example, a bot program can automatically read data, enter data, submit data, click on boxes and buttons, make other selections, open pages, click on links, and the like.

Intelligent RPA uses software bots to automate repetitive manual-based processes that are performed via a computer. For example, a process of a user entering data values into fields of a user interface of a software application may be replaced with an automated bot. That is, rather than a human reading data from a source or multiple sources and entering them into fields of a user interface, a bot can be programmed to perform the same process automatically. Some of the benefits of the bot include systematizing time-consuming manual activities which significantly increase the speed at which such processes are performed. Furthermore, bots remove the possibility of human error in the data entry thereby ensuring that the data being entered is correct. Bots can open applications, click buttons, set values, close windows, etc. Furthermore, a bot can be programmed to open database tables, read values at specific locations in the tables, store values, etc.

Robotic processing automation may provide or otherwise access a recorder widget that can record the events on the user interface and then replay the events in the order they are recorded. However, for the recorder to work, typically a user must manually select a capture button each time a new content appears on the user interface. The capture function captures metadata of the page displayed within the window/web browser of the application. Here, the metadata may include a unique identifier of the page, the individual UI elements (e.g., boxes, fields, buttons, etc.) on the page, and the like. If the capture function is not pressed, the recorded steps will be recorded under the wrong page identifier. Thus, a user must manually recognize and press/select the capture button each time the page content changes on the screen. However, because the user must act, this process is subject to mistakes and human errors. For example, the user may forget to press the capture button. As another example, the user may not even be aware that they screen content has changed.

The example embodiments overcome the drawbacks in the art by automatically detecting when screen content has changed based on user interface metadata that is analyzed each time a request is sent from the client-side to the server-side of the application. For example, the system described herein may compare user interface metadata on each round trip between the front-end of the application and the back-end of the application. The user interface data may include a document object model (DOM) of the user interface or something similar which may include position data of the user interface elements on the screen and unique identifiers of the user interface elements.

When the content on the screen changes, for example, a new or different user interface element is displayed, a page change occurs, or the like, the DOM will also change to reflect the new or different UI element or page thereby enabling the system herein to detect the change. In response, the system may send a hint or warning message to the user interface recommending that the user initiate the capture function because the screen content has changed. As another example, rather than sending a hint (or in addition to sending a notification), the system may auto-capture the updated user interface metadata and store it for later comparison. Each time a new round trip occurs, the user interface metadata may be compared to a most-recent round trip to determine whether the user interface metadata has changed each round trip.

As an example, the software application may be a WebGUI application such as an SAP GUI for HTML application. WebGUI relies on a client-server architecture in which a client-side or front-end of a software application communicates with a server-side or back-end of the software application to render content within a graphical user interface on the client-side. WebGUI is one of the Internet Transaction Server (ITS) implementation models for screen-based applications that allow users to run SAP dialog transactions directly from a Web browser, the other two models including SAP GUI for Windows and SAP GUI for Java. This model automatically maps the screen elements in SAP transactions to HTML using $HTML^{Business}$ functions implemented inside the ITS. Each $HTML^{Business}$ function handles a different screen element and uses the screen attributes to position HTML controls at the same position on the HTML page as on the system screen. With WebGUI, the user interacting with the screen needs little or no knowledge of HTML, $HTML^{Business}$, or JavaScript. Also, the user does not have to be familiar with the software development environment, because the WebGUI generates the required templates to automatically run a WebGUI application.

Here, the front-end of the application may detect user interface events and send requests for content to the back-end of the application with identifications of the detected user interface events including an ID of the user interface element where the event occurred, and a type of action (e.g., an action code) that is performed with respect to the user interface element. In response, the back-end can provide content corresponding to the detected user interface event for rendering in the user interface. For example, the content rendered by the server may include graphical user interface content such as modifications to images, buttons, data, and the like, which are visible within the user interface.

RESTGUI is a protocol that works as a bridge between a front-end of a WebGUI application (client-side) and a back-end of the WebGUI application (server-side). RESTGUI provides an interface/mechanism such as an application programming interface (API) which exposes the session between the client and the server and enables the web extension to subscribe to events at the back-end. Whenever a request comes in from the front-end of the WebGUI application, the request is sent as is to the backend. Here, the backend has an ITS layer that translates the data. The RESTGUI interface exposes a request/response mechanism between the client and the server such that the web extension can subscribe to specific events at the server and receive notifications of those events from the server. For example, the client can send a request directly to the backend with some special notations and they represent each control item with IDs, formatting, and the whole thing is readable at the server side because of this layer. In this example, the application may be displayed/posted in the web browser. The web extension is side-by-side with the web application logically.

The web extension of the example embodiments utilizes the interface provided by the REST GUI protocol to receive communications between the front-end and the back-end. The web extension may subscribe to events via the RESTGUI protocol using a window message (e.g., a Window.POST message). Here, an initial subscription tells the backend/REST GUI side to provide the web extension with the state/position data of UI controls that are interacted with by a user on the front-end of the application. Then every time a new event occurs associated with that data, the web extension is notified by the backend and the web extension may forward pass the events to a recorder widget that is hosted locally on the client-side. For example, a recording widget may be running as a desktop application/studio agent. The recording widget can record each user interface interaction on the front-end. The recording widget may also provide a window that lists the recorded events in the order they are detected.

In the example embodiments, a recorder widget may connect to a session between a front-end and a back-end of a WEBGUI software application, capture and record the user interface actions on the front-end of the WEBGUI application and the instructions that are sent to the back-end of the WEBGUI application, record the responses from the server, and build a bot based on the recorded user interface actions. For example, the recorder may connect to a session between a front-end and a back-end of the software application via a web extension. In the example embodiments, the web extension (also referred to as a browser extensions) is a small software module for customizing a web browser and may be included in the web browser. The web extension may enable user interface modifications, cookie management, and the like. However, it should be appreciated that the embodiments are not limited to a web extension. That is, the example embodiments may be implemented via a more traditional recorder architecture.

The recorded events can be used to build a bot that can understand the WebGUI application and automatically perform various business contexts on the user interface of the front-end of the application. WebGUI refers to the user interface that is output on the screen, while RESTGUI refers to the mechanism/interface that exposes the session between the client and the server executing the WebGUI application. In some embodiments, the user interactions may be performed on the client side, while the instructions are executed on the server-side which has the logic there. The web extension may subscribe to events for the recorder from the server-side and the server-side can send notifications of events to the recorder as they occur in real-time. For example, the web extension can connect to the session between the front-end and the back-end via RESTGUI to capture user interactions on the user interface of the WebGUI application which can be stored in a file and exported to a development environment such as an integrated development environment (IDE) where the bot can quickly and easily be built in an automated manner.

When a client-side of a software application sends a user interface request to the server, the REST GUI protocol follows the normal client-server relationship. The web extension may obtain and utilize content of a currently open page of the application in the session between the front-end and the back-end of the application. For example, the web extension may consume a window object (e.g., the DOM, etc.) where the user interface is rendered enabling the web extension to interpret the information included in the user interface requests sent to the server from the front-end of the application using the same window object. For example, the window object may identify user interface elements with unique IDs and also positioning information (pixel locations, etc.) of the user interface elements on the screen. The particular page rendering is done based on the server state information. The web extension then forward the events that are captured to the recorder where the events are stored for subsequent bot generation, etc.

FIG. 1A illustrates an example of a computing environment 100 for application development in accordance with an example embodiment. It should be appreciated that the computing environment 100 is just an example and it should also be appreciated that other elements or different elements not shown may be included in the computing environment 100. Referring to FIG. 1A, the computing environment 100 includes a software application (e.g., a WebGUI application, etc.) which includes a client-side or front-end 110 and a server-side or back-end 120 which communicate with each other via a session 130 (e.g., a web session, etc.) The session may be established via hypertext transfer protocol (HTTP) messages. In some embodiments, an authentication protocol may be performed between the front-end 110 and the back-end 120 to establish the session 130.

According to various embodiments, an agent 140 can be used to manage the recording process. Furthermore, a recorder 150 may be implemented locally on the client device and may connect to the session 130 via a web extension 112 within a browser of the client device where the front-end of the software application is running. The recorder 150 records user interactions that occur on the front-end 110 of the application and the responses from the back-end 120 of the application. In some embodiments, the requests/responses are captured via the session 130. As another example, the requests/responses can be provided from either the front-end 110 or the back-end 120.

The computing environment 100 also includes an integrated development environment (IDE) 170 that provides a complete bot development environment for creating and testing a bot. in some embodiments, the IDE 170 may be an IDE for cloud applications hosted on a cloud platform which is the server-side. In order to create a bot for automating a WebGUI application, the user first needs to capture the application from the IDE 170 and then launch the recorder 150 to record the user interactions on the user interface of the front-end 110 of the application. A WebGUI provider 160 may process the recorded user interface actions and application metadata and transform captured event information (e.g., action code, control details, position parameters, etc.) into bot-specific information (e.g., screens, activities, automation, etc.) The recorder 150 may be a standard and generic recording universal recording widget that provides functionality to start recording, stop recording, export recording and view recorded step information. It also has features to undo, redo and delete steps.

Meanwhile, the agent 140 may be a hub that provides a central communication interface between the IDE 170, a WebGUI provider 160, the recorder 150, and the application (e.g., front-end 110 and the back-end 120) through a web extension 112 (e.g., CHROME® extension, etc.) The recorder 150 may be implemented via a web extension 112 that is integrated into the application itself through a WebGUI connector API. The web extension 112 may interact with the back-end 120 of the application using a WebGUI connector API 111. The recorder 150 may use the web extension 112 to capture screen shots and content, metadata, establish a connection, disconnection, record interactions on the user interface, and the like. The WebGUI connector API 111 may define a common request/response json structure and be implemented an asynchronous interface. The WebGUI connector API 111 provides an API for creating the connection, closing the connection, subscribing to events for recording, executing batch bot info, and the like. The web extension 112 may use these APIs to connect the recorder 150 to the application and subscribe to recording events and executing the automation.

In the example embodiments, the recorder 150 may utilize a "window object" where the UI is rendered and record requests to the server using the same window object. In some embodiments, the window object may include a DOM, or other metadata description of the web page, and the like. The web extension 112 is capable of utilizing the session where the page is open. The may send a request to the server using the same window object. Page rendering is done based on server state information. The server state can also be captured by the recorder. For example, the recorder may request that when a web browser opens a URL, requests to the server for this page should be recorded. Likewise, the content sent from the backend server to the front-end UI where it is rendered in the window may be recorded. The web extension 112 has the capability to sit beside the web application and have the visibility to see the window object and a document object model (DOM) via the web application. The DOM may include an API that defines the logical structure/layout of pages and documents (e.g., HTML, XML, etc.) and the way that the pages and documents are accessed and manipulated.

When a user clicks on a button via the UI on the front-end, a request is sent to the server. The server then responds with what needs to be rendered/content. The same thing happens with the recorder 150. Whenever a button is pressed on the UI, the application continues to send the request to the backend and the web extension 112 captures it and sends it to the recorder 150 via the agent 140.

The WebGUI connector API 111 used by the web extension 112 provides simple interfaces/APIs for connecting to a session and recording transactions running on a WebGUI application user interface. The WebGUI connector API 111 also provides APIs for capturing the current state of the WebGUI page and position of the UI elements/controls. These two APIs allow the web extension 112 to capture both the state of the page and the position of the actions/events and forward these to the recorder 150. Using these two pieces of information, the system can also reconstruct the events and build a bot. The recording of the application page may be performed via creation of a subscription.

The system described herein may be implemented in the form of a software application that is part of an RPA suite of software. The software may transform WebGUI events into high level application-level descriptions of the activities. Furthermore, the system may transform the high level activities into WebGUI requests. Recording and automation of events created by WebGUI applications using WebGUI connector APIs differentiates the example embodiments from other RPA tools. By recording the events directly from the user interactions on the user interface, there are no risk of human errors. Furthermore, the amount of time that it takes to create a bot program can be reduced significantly because all of the steps may be automated and performed by a computer via an API connector, a recorder, and a mapping.

Figure 1B:
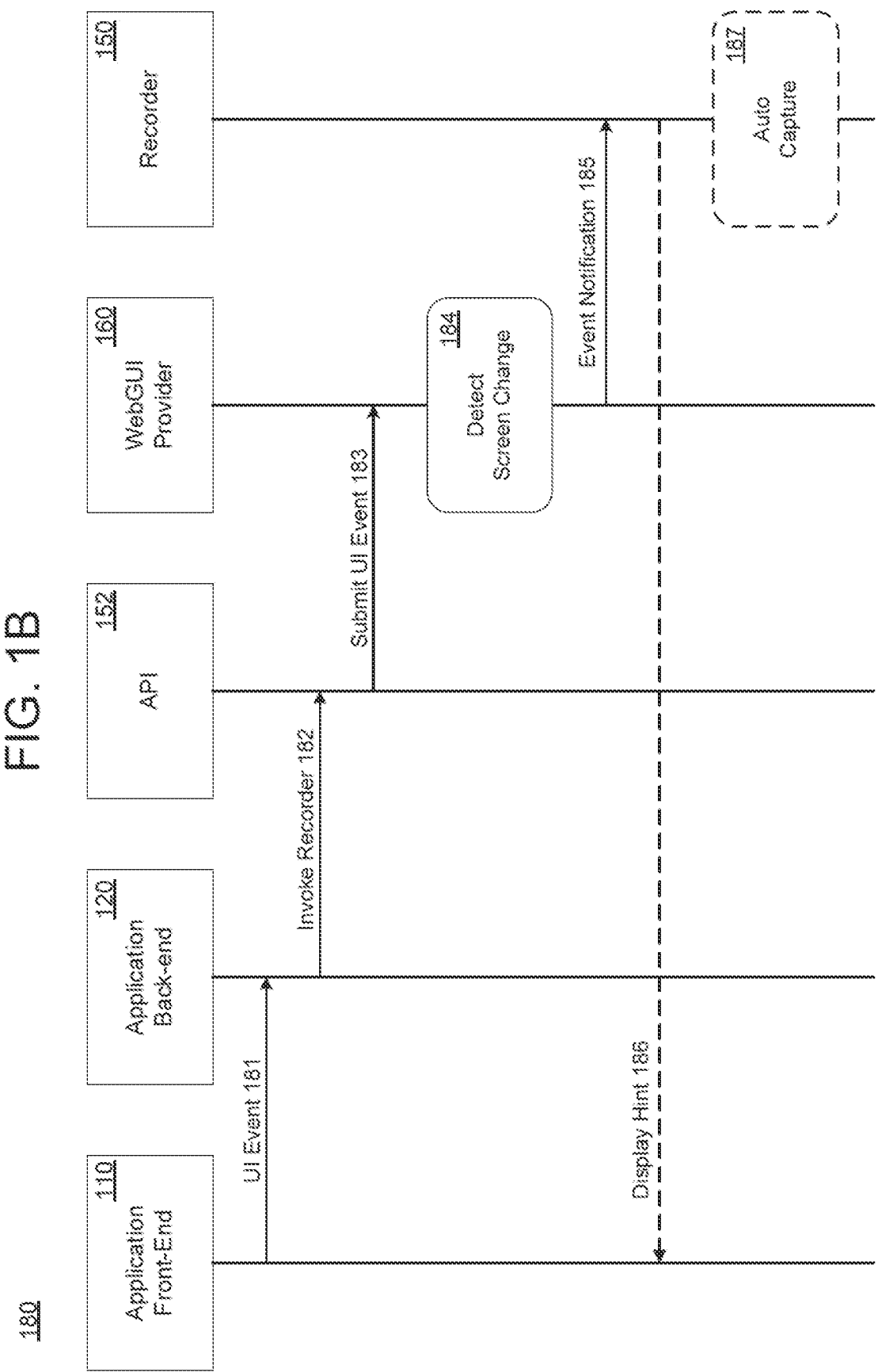
FIG. 1B is a diagram illustrating a communication process during a recording operation in accordance with an example embodiment.

FIG. 1B illustrates a round-trip communication process 180 during a recording operation in accordance with an example embodiment. Referring to FIG. 1B, in 181, each time a user interaction/event occurs on the user interface of the front-end 110 of the application, a request with the event details may be sent from the front-end 110 of the application to the back-end 120 of the application hosted on a server. For example, the request may identify a UI element or elements which are being interacted with, the content being input, the changes made to existing content, etc. In 182, the server-side may invoke an application programming interface (API) 152 of the recorder 150 which submits the user interface event to the WebGUI provider 160, in 183. Here, the user interface event may be submitted via the API 152 that may be implemented via the web extension 112 shown in FIG. 1A.

The WebGUI provider 160 may have access to user interface metadata such as a document object model or window object of the user interface. In 184, the WebGUI provider 160 may identify the most-recent user interface metadata (e.g., of an immediately-previous round trip process, etc.) between the front-end 110 of the application and the back-end 120 of the application. Furthermore, the WebGUI provider 160 may compare the most-recent user interface metadata of the current round trip to the most-recent user interface metadata of an immediately previous round-trip process to detect a change in the screen content of the user interface, for example, a new page has been opened or a new user interface element has been displayed. To track the user interface metadata each round trip, the WebGUI provider may manage a document or other storage file such as a JavaScript Object Notation (JSON) file, an extensible markup language (XML) file, or the like.

In response to detecting the change, in 185, the WebGUI provider 160 may notify the recorder 150 which may take various actions in response. For example, in 186, the recorder 150 may output a warning message on a screen of the front-end 110 of the application which notifies/hints to the user to press the capture button because the screen content has changed. As another example, in 187, the recorder 150 may automatically capture (auto-capture) the updated metadata including any new screen content or different screen content and store the updated user interface metadata for use when recording the user interface interactions. By capturing the current/new screen, each of the user interface events that are subsequently recorded will be recorded with a link to the current/new screen such as a page identifier or some other identifier of the screen thereby ensuring that the user interface events are logged under the correct screen/UI. This can be very beneficial for subsequent development of the bot program where other controls may be manipulated besides the controls that are part of the UI event. In other words, by capturing the entire user interface metadata such as a DOM, the system enables a developer to subsequently control the other user interface elements when designing the bot, even though the recorded steps may not include the other user interface elements.

During every interaction with the application, current screen and new screen metadata may be compared to identify the screen changes. In a WebGUI application, whenever a user interacts with user interface controls, the data is sent to the server to process and once that is completed, the user interface is updated or re-rendered based on the response received from the server. This scenario is called a roundtrip. The application allows us to subscribe to an event that can give Metadata or the state of the application. This event generally fires after the completion of every roundtrip to give the new metadata about the complete user interface of the application.

The system may receive the user interface metadata about the latest state of the application after every round trip, and compare this with the user interface metadata of the last roundtrip to see if any changes can be identified in the application. In order to detect the screen change in the application accurately, position data provided by the application after every roundtrip may be used. For example, the position data may be a JSON file containing array objects where each object represents a UI element in the screen. Each object contains unique attributes and position data (e.g., pixel location, arrangement with respect to other elements on the screen, etc.) of the UI element. After every roundtrip, the attributes of each element in the position data from the latest roundtrip is compared with the position data from the last roundtrip. This way if any element type is not same or if the element is not found during the comparison, the system can conclude that the screen has changed.

Figure 2A:
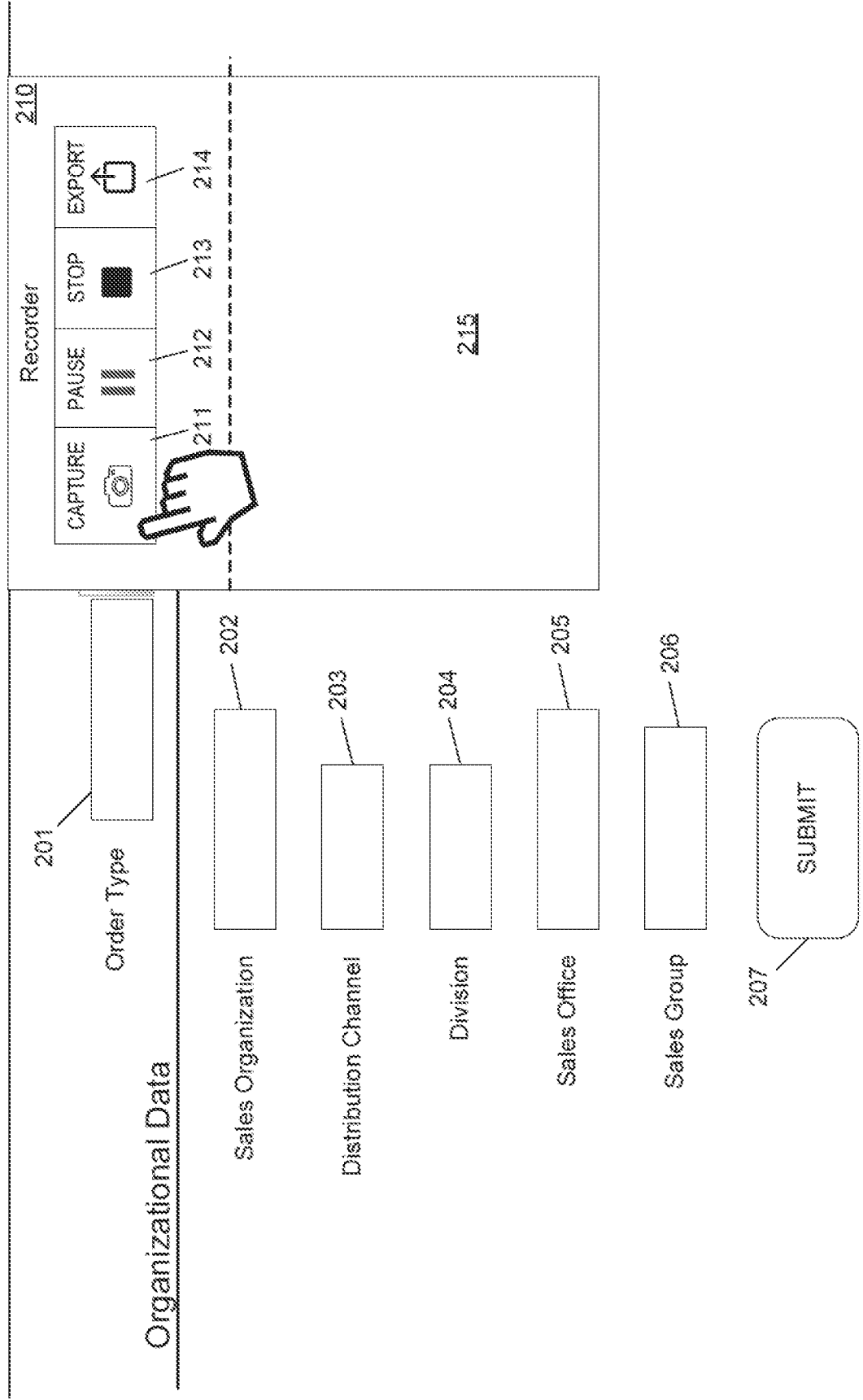
FIGS. 2A-2D are diagrams illustrating a user interface of a software application which includes a recorder window in accordance with an example embodiment.

FIGS. 2A-2D illustrate interactions with a user interface of a WebGUI application which includes a recorder window in accordance with an example embodiment. Referring to FIG. 2A, a user interfaces 200A of a software application includes a window 210 of a recorder in accordance with an example embodiment. Here, the user interface 200A corresponds to a client-side or front-end of the application. The user interface 200A may include various input fields, buttons, checkboxes, menus, and the like, which can be interacted with by a user using input commands such as entered via a keyboard, a mouse, a finger, or other touch mechanism. In the example of FIG. 2A, the user interface 200A includes a drop-down field 201 for entry of an order type, and fields 202, 203, 204, 205, and 206 for text entry. Each field includes an identifier/name of the data field as well as a box or other field where data can be entered. The user interface 200A also includes a submit button 207.

In this example, it can be seen that various patterns of user interface interaction can be performed by a user entering data into the user interface 200A. Each step that is performed can be recorded via the architecture shown in FIG. 1A, or the like. According to various embodiments, the window 210 with controls for the recorder may be displayed via the user interface 200A. The window 210 may be a pop-up window, an overlay, or the like, that is displayed on the user interface 200A and which provides buttons 211, 212, 213, and 214 for performing actions such as record, pause, stop, and export. In some embodiments, the window may block or hide other user interface content underneath. When a user presses the button 211 (i.e., the capture button), the recorder may capture the user interface metadata and begin recording the user interface events that occur on the user interface 200A. For example, the window 210 may include an activity description area 215 with an area where human-readable descriptions of user interface events can be displayed/rendered.

Figure 2B:
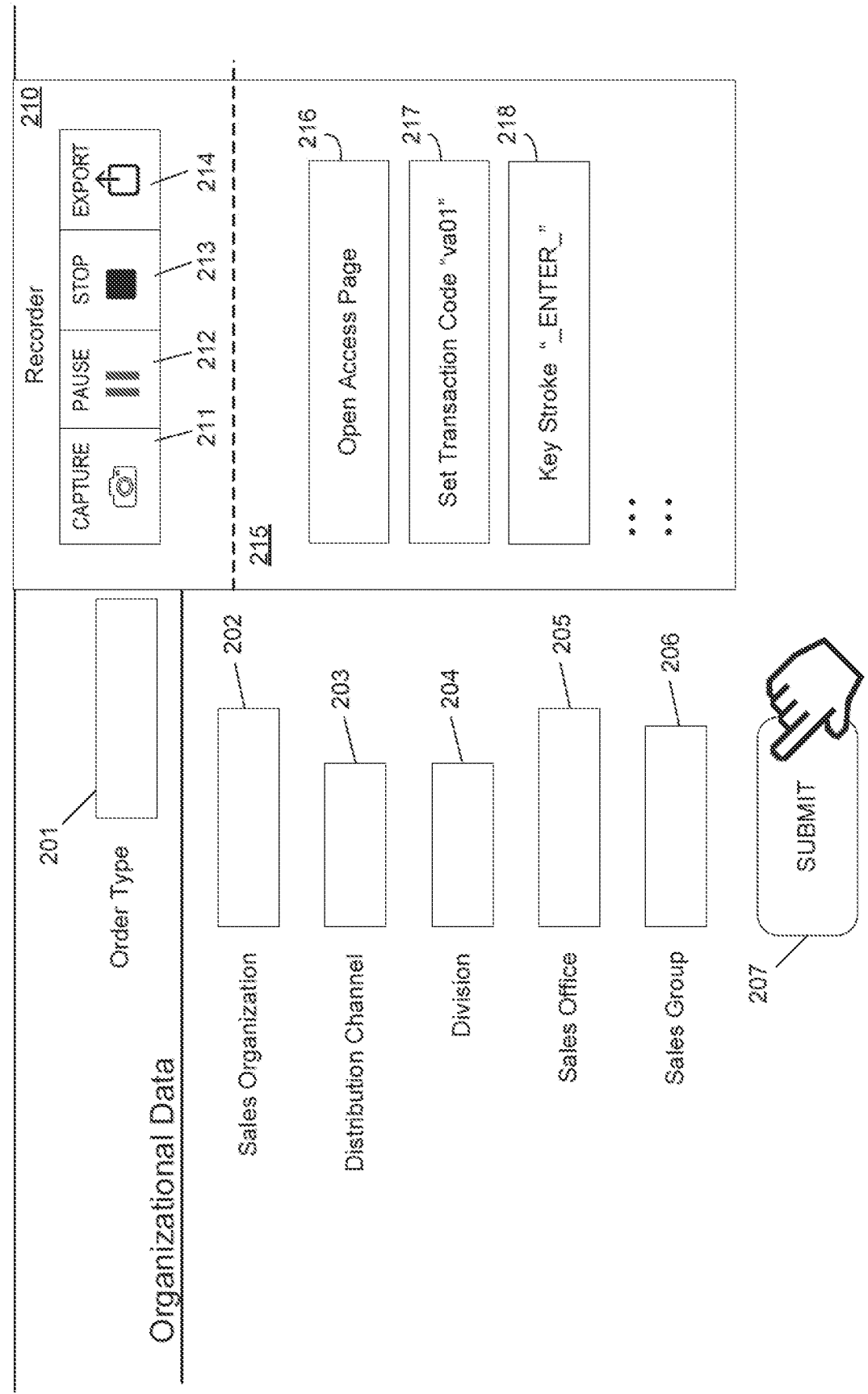

Referring now to FIG. 2B, the user interface 200A has changed state and is now user interface 200B. Here, the user has entered three different user interface events that have been recorded and translated. For example, each time a new event is recorded from the user interface 200A/200B, the translation of the event may be displayed in the activity description area 215 within the window 210. Here, the activity description area 215 may start off as empty and be filled with recorded events as they occur in real-time. In this example, events 216, 217, and 218 have been detected in sequence. Each time a new event is detected, a notification may be displayed somewhere on the user interface 200B such as within the window 210 to notify the user that a new event has been recorded. Also, a description of the event may be translated and provided via the window 210. The events may be displayed in the order in which they are detected thereby providing the user with both a notification of the event that occurred and an order in which it occurred.

Figure 2C:
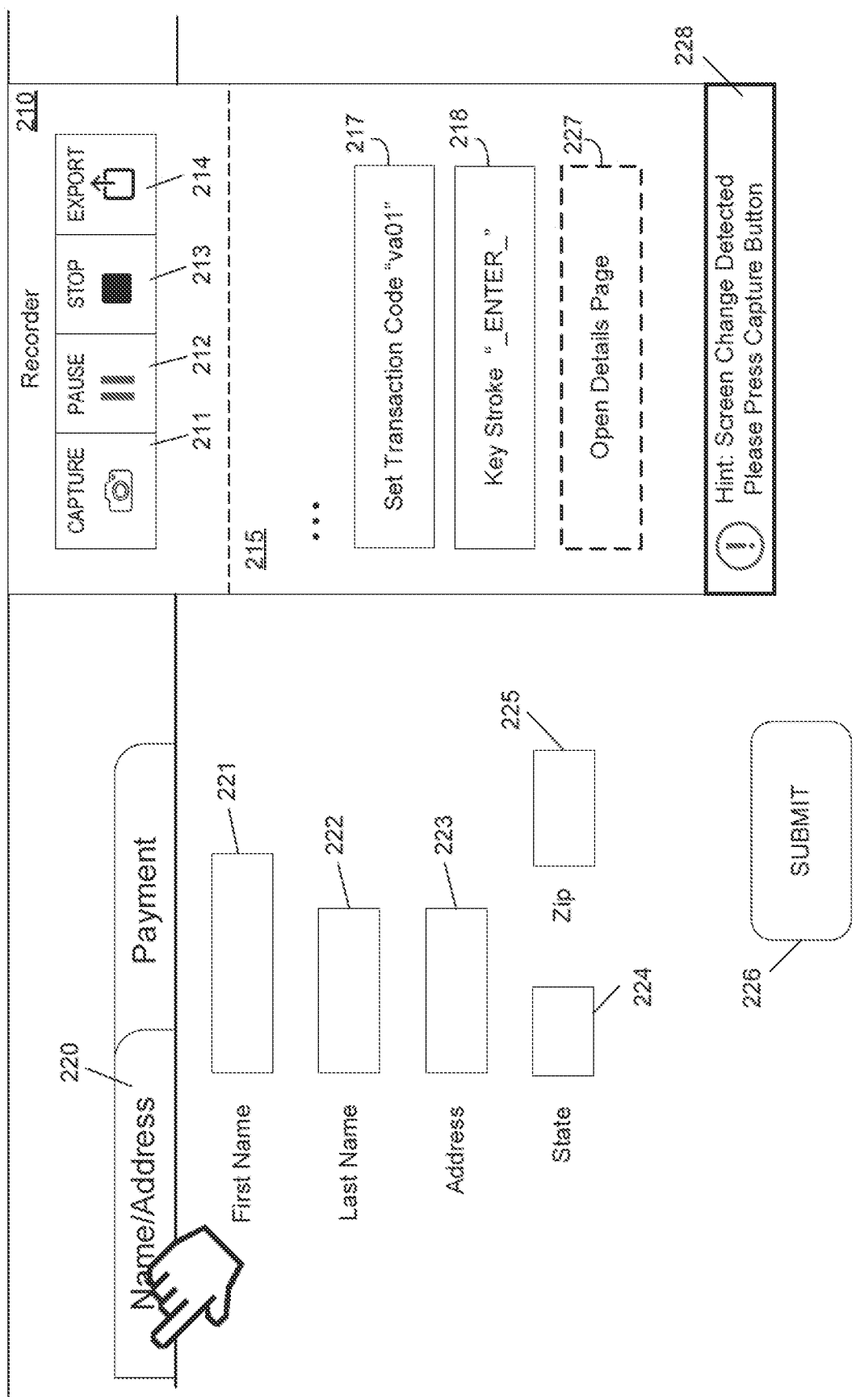

Now, when the user enters the submit button 207 on the user interface 200B shown in FIG. 2B, the state of the user interface 200B changes by opening a new page as shown in user interface 200C shown in FIG. 2C. The new page allows the user to manipulate input fields and boxes and record additional information via the user interface 200C. For example, the user interface 200C includes new tabs 220 and 230 (shown in FIG. 2D), and also new user interface elements 221, 222, 223, 224, 225, and 226. The action of opening the new page may be recorded as an event 227 and displayed in the activity description area 215 which includes a listing of recording events. The change in user interface content can be detected based on a change in user interface metadata that includes information about the new/changed page content including new UI identifiers, new positioning information, new elements, etc.

The new screen needs to be "captured" and the window data obtained for the current screen content, otherwise, the user interface that are recorded will be recorded under the wrong screen identifier which does not include the same user interface elements, content, etc. However, it is common for a user to forget to capture the new screen. That is, traditionally, a user must remember to capture the screen at the time when the new screen change occurs, otherwise any recorded events will be recorded under the wrong screen. Furthermore, in order to recognize the screen change, a screen title cannot be used due to the fact that in certain scenarios screen title can be same, but content can change.

The example embodiments address this issue by adding a hint function and an auto recorder function to the recorder to detect the screen changes in the application. Thus, a hint can be provided by the service that implements the recorder to the user upon screen change. As another example, the recorder may auto capture the new screen when the screen change is detected. Some of the benefits provided by the hint and the auto capture includes reducing or eliminating errors caused by users during recording of the application, better recording experience as user need not remember to capture a screen, and reduce automation failures.

Referring again to FIG. 2C, in response to automatically detecting the change in screen content (e.g., one or more of a new page and a new user interface element, etc.), the recorder may display a notification 228 that includes a hint to the user to press the capture button 211 and an indication that the screen content has changed. Accordingly, the user is given a hint at a time at which the screen change occurs. That is, the notification 228 may be provided in real-time when the change in screen content has been detected. Thus, the recorder can provide the user with a notification that is temporally relevant to the screen change. It should also be appreciated that instead of or in addition to sending the notification 228, the recorder may auto capture the new user interface metadata such as the DOM and the page content details.

Figure 2D:
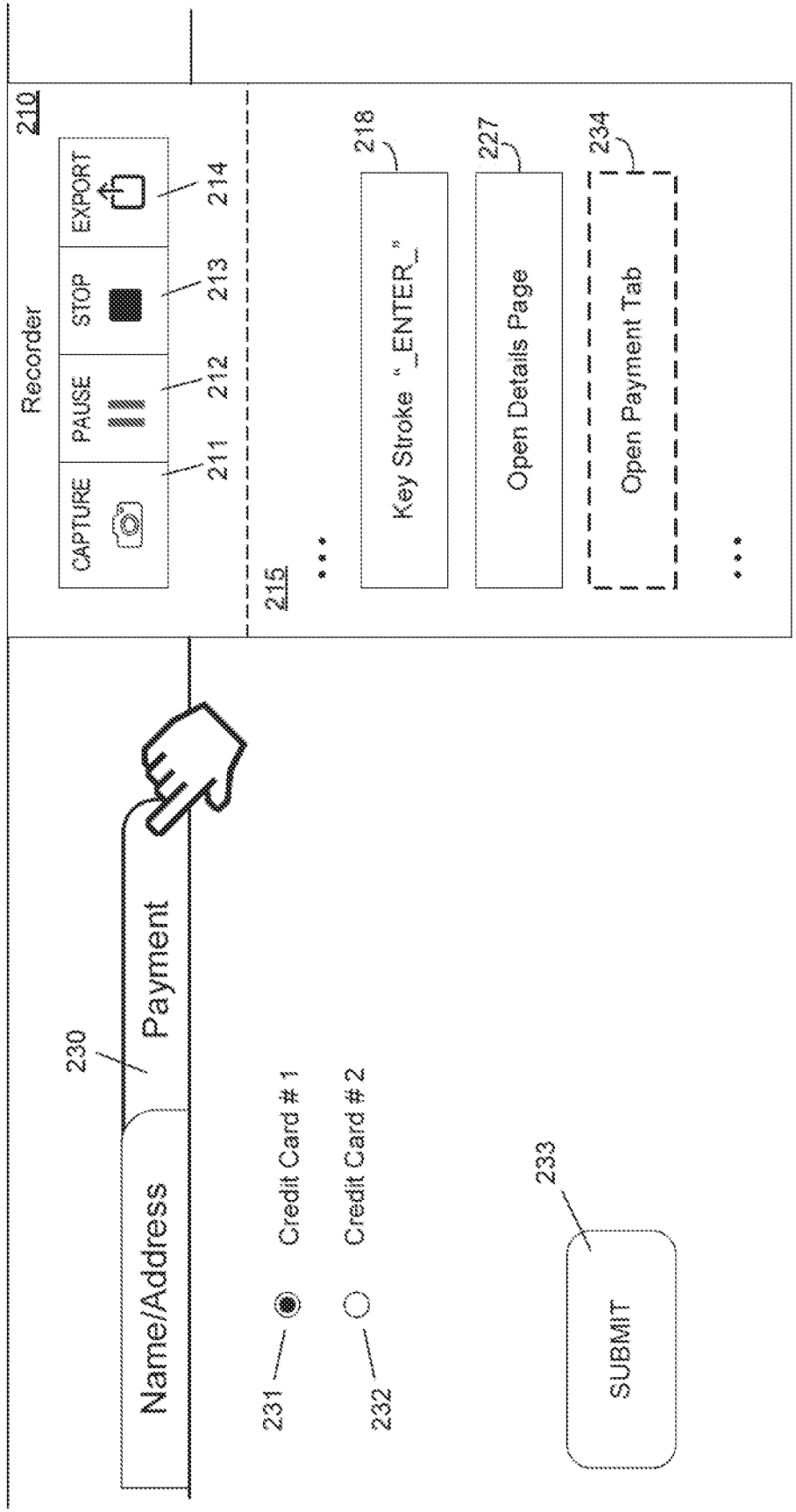

Referring to FIG. 2D, a user presses the tab 230 which causes the user interface 200C to change to the user interface 200D. Here, the page stays the same (i.e., the screen title stays the same) but the user interface elements on the page change. In particular, radio buttons 231 and 232 and field names for the radio buttons 231 and 232 are displayed along with a new button 233, while the user interface elements 221-226 shown on the user interface 200C of FIG. 2C are removed. Furthermore, the recorder adds a new entry 234 to the activity description area 215 to identify that a new event has been recorded (i.e., the selection of the tab 230).

Figure 3A:
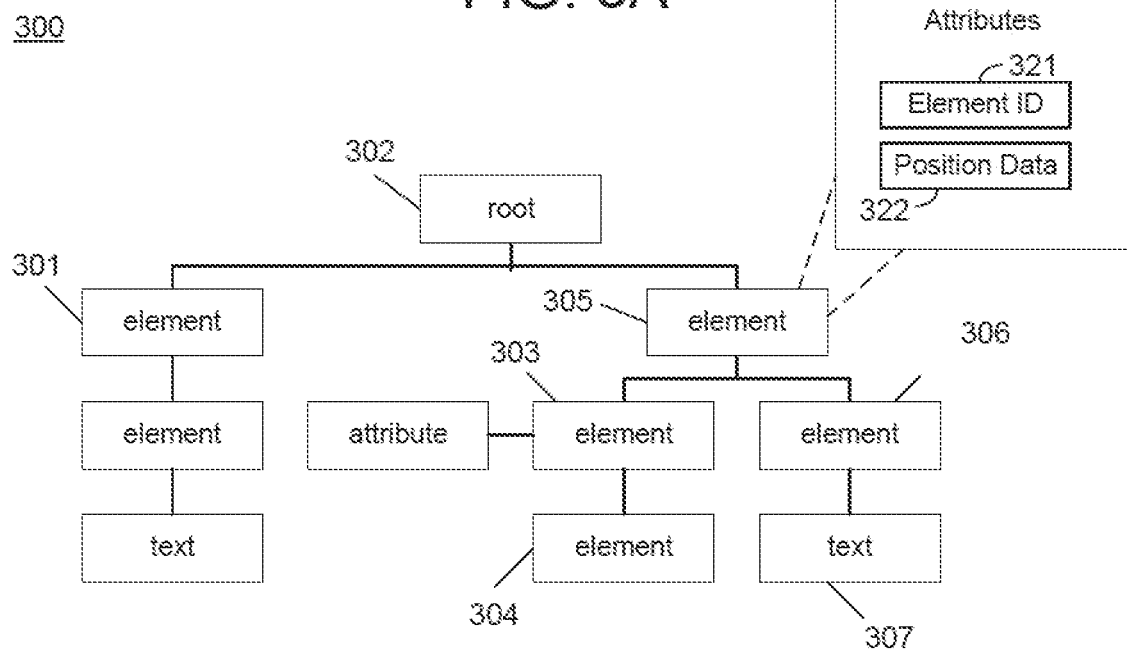
FIGS. 3A-3B are diagrams illustrating user interface metadata of a page of an application in accordance with an example embodiment.
Figure 3B:
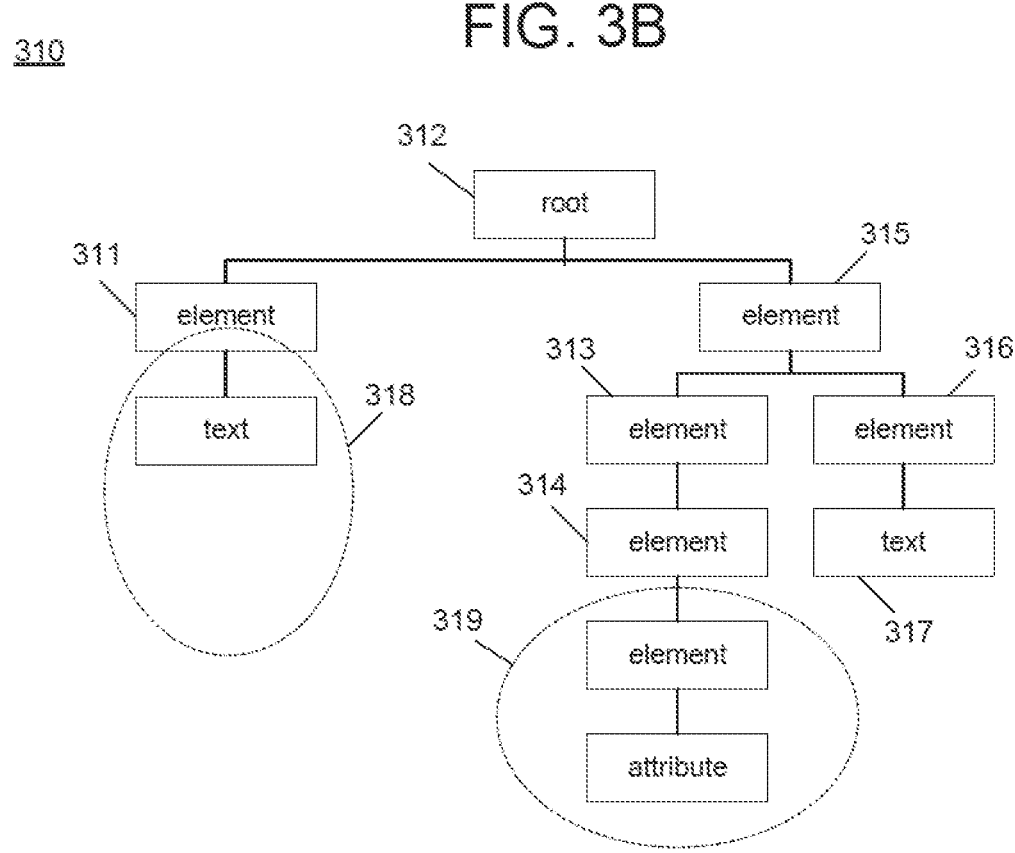

FIGS. 3A-3B illustrate examples of user interface metadata 300 and 310 of sequential screens of an application in accordance with an example embodiment. Referring to FIG. 3A, the user interface metadata 300 includes a structure that organizes/arranges the UI data of a first screen of the application in a tree-like structure. This may be part of a DOM or DOM specification, but embodiments are not limited thereto. The user interface metadata 300 includes a plurality of UI elements being displayed on the screen such as hypertext transfer protocol (HTTP) elements, attributes, text, and the like. For example, each element may include attributes such as a unique identifier 321 and position data 322.

Likewise, referring to FIG. 3B, the user interface metadata 310 includes a similar structure as shown in the user interface metadata 300 but the user interface metadata 310 refers to a next screen in the application that is in sequence with the first screen captured by the user interface metadata 300. However, in this case, the user interface metadata has changed as indicated by area 318 and area 319 on the user interface metadata 310.

The system described herein may compare the user interface metadata 300 and the user interface metadata 310 and detect whether the user interface content has changed and trigger a hint notification or an auto-capture. In this case, UI features 301, 302, 303, 304, 305, 306, and 307 within the user interface metadata 300 are the same as UI features 311, 312, 313, 314, 315, 316, and 317 included within the user interface metadata 310. However, differences exist between areas 318 and 319 in the user interface metadata 310 and corresponding areas of the user interface metadata 300. Thus, the change of screen content can quickly be detected from user interface metadata 300 and 310.

FIG. 4 illustrates a method 400 of displaying a hint message in accordance with an example embodiment. As an example, the method 400 may be performed by a cloud platform, a web server, an on-premises server, a user device, a combination of devices, and the like. The method 400 may be an automated method that is performed by a software application. In other words, the commands may be predefined and issued by the software application during an automated recording process, an automated conversion process, and an automated bot generation process. Referring to FIG. 4, in 410, the method may include capturing user interface metadata of content being displayed by a user interface of a client-side of the software application. For example, the capturing may be performed in response to a user interface selection/command entered via a user interface.

In 420, the method may include activating a recorder that is configured to record events transmitted between the client-side of the software application and a server-side of the software application and assign them to the user interface corresponding to the captured user interface metadata. Here, the recorder will automatically assign the recorded events to a particular screen that has most-recently been captured. For example, the recorder may be implemented via a web extension or other service that can be called to record events on screens that have metadata captured on the user interface.

In 430, the method may include receiving updated user interface metadata based on a user interaction on the user interface of the client-side of the software application. In 440, the method may include determining that user interface content has changed based on a comparison of the captured user interface metadata to the updated user interface metadata. In 450, the method may include displaying a hint message via the user interface of the client-side of the software application which reminds a user to capture the updated user interface metadata.

In some embodiments, the capturing may include capturing identifiers of user interface elements displayed on the user interface and positions of the user interface elements within the user interface from the user interface metadata. In some embodiments, the determining that the user interface content has changed may include detecting that a new page of the software application has been opened within a web browser based on the comparison. In some embodiments, the determining that the user interface content has changed may include detecting that user interface elements within a same page of the software application have changed within a web browser based on the comparison.

In some embodiments, the determining that the user interface content has changed may include detecting a change to user interface elements within a document object model (DOM) specification of the software application. In some embodiments, the method may further include detecting that a new capture command has been submitted, and in response, terminating the displaying of the hint message. In some embodiments, the displaying the hint message may include displaying the hint message inside a recorder window of the user interface of the client-side of the software application. In some embodiments, the recorder window may further include a display of user interface events that have already been captured prior to detecting that the user interface data being displayed within the web browser has changed.

Figure 5:
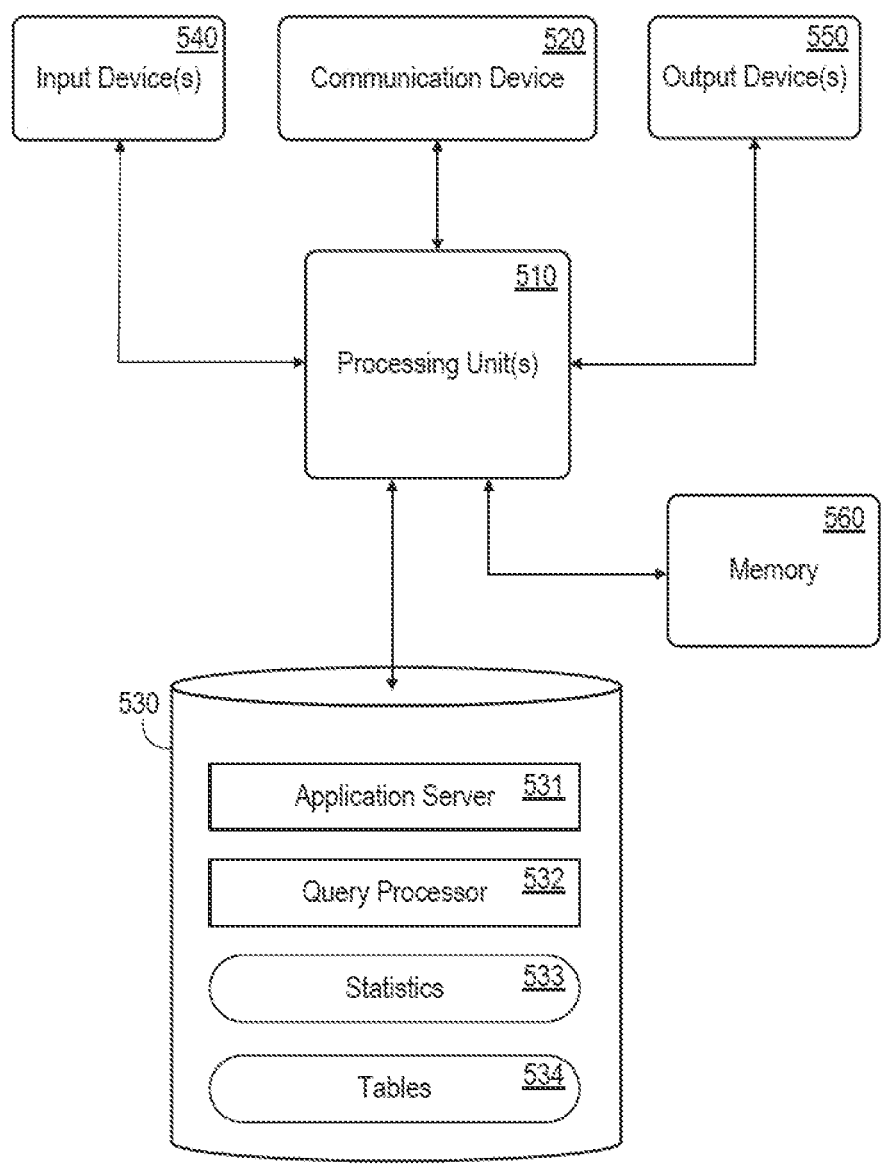
FIG. 5 is a diagram illustrating a computing system for use with any of the examples herein in accordance with an example embodiment Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

FIG. 5 is a diagram of a server node 500 according to some embodiments. The server node 500 may include a general-purpose computing apparatus and may execute program code to perform any of the functions described herein. The server node 500 may comprise an implementation of a remote terminal or a host platform, in some embodiments. It should also be appreciated that the server node 500 may include other unshown elements according to some embodiments and may not include all of the elements shown in FIG. 5. The server node 500 may perform the method 400 shown in FIG. 4.

Server node 500 includes processing unit(s) 510 (i.e., processors) operatively coupled to communication device 520, data storage device 530, input device(s) 540, output device(s) 550, and memory 560. Communication device 520 may facilitate communication with external devices, such as an external network or a data storage device. Input device(s) 540 may comprise, for example, a keyboard, a keypad, a mouse or other pointing device, a microphone, knob or a switch, an infra-red (IR) port, a docking station, and/or a touch screen. Input device(s) 540 may be used, for example, to enter information into the server node 500. Output device(s) 550 may comprise, for example, a display (e.g., a display screen) a speaker, and/or a printer.

Data storage device 530 may comprise any appropriate persistent storage device, including combinations of magnetic storage devices (e.g., magnetic tape, hard disk drives and flash memory), optical storage devices, Read Only Memory (ROM) devices, etc., while memory 560 may comprise Random Access Memory (RAM). In some embodiments, the data storage device 530 may store user interface elements in tabular form. For example, one or more columns and one or more rows of user interface elements may be displayed in a two-dimensional spreadsheet, table, document, digital structure, or the like.

Application server 531 and query processor 532 may each comprise program code executed by processing unit(s) 510 to cause server node 500 to perform any one or more of the processes described herein. Such processes may include estimating selectivities of queries on tables 534 based on statistics 533. Embodiments are not limited to execution of these processes by a single computing device. Data storage device 530 may also store data and other program code for providing additional functionality and/or which are necessary for operation of server node 500, such as device drivers, operating system files, etc.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:
a processor configured to
display a page of content within a user interface of a client-side of a software application and a capture button;

capture initial user interface metadata of the page of content being displayed by the user interface of the client-side of the software application, the initial user interface metadata comprising a document object model (DOM) of the page of content, and transmit the DOM to a recorder;

activate the recorder to record events transmitted between the client-side of the software application and a server-side of the software application and store an association of the events recorded with the initial user interface metadata, the events comprising user interface actions on the client-side, instructions sent to the server-side, and responses received from the server-side;

receive updated user interface metadata of the page of content being displayed from the user interface of the client-side of the software application based on a user interaction on the user interface of the client-side of the software application;

determine that the content displayed within the page of content has changed based on a comparison of the captured DOM to the updated user interface metadata;

in response to the determination that the content displayed within the page of content has changed, display a window on the user interface with a reminder message therein which reminds a user to select the capture button; and responsive to receiving the user input comprising a selection of the capture button by the user, capturing updated user interface metadata of the page of content and storing an association of the events recorded after the user input with the updated user interface metadata, the updated user interface metadata comprising identifiers of user interface elements displayed within the user interface and positions of the user interface elements within the user interface.

2. The computing system of claim 1, wherein the DOM comprises identifiers of user interface elements displayed on the user interface and positions of the user interface elements within the user interface.

3. The computing system of claim 1, wherein the processor is configured to detect that a new menu has been opened on the page based on the comparison of the DOM and the updated user interface metadata.

4. The computing system of claim 1, wherein the processor is configured to detect that user interface elements within the page of content have changed based on the comparison of the DOM to the updated user interface metadata.

5. The computing system of claim 1, wherein the DOM and the updated user interface metadata each comprise a DOM specification of the software application.

6. The computing system of claim 1, wherein the processor is further configured to detect that a new capture command has been submitted, and in response, terminate the display of the reminder message on the user interface.

7. The computing system of claim 1, wherein the processor is configured to display the window inside a recorder window of the user interface of the client-side of the software application.

8. The computing system of claim 7, wherein the recorder window further comprises a display of previously-recorded user interface events that have already been captured prior to determining that the user interface content has changed.

9. A method comprising:
displaying a page of content within a user interface of a client-side of a software application and a capture button;

capturing initial user interface metadata of the page of content being displayed by the user interface of the client-side of the software application, the initial user interface metadata comprising a document object model (DOM) of the page of content, and transmitting the DOM to a recorder;

activating the recorder to record events transmitted between the client-side of the software application and a server-side of the software application and storing an association of the events recorded with the initial user interface metadata, the events comprising user interface actions on the client-side, instructions sent to the server-side, and responses received from the server-side;

receiving updated user interface metadata of the page of content being displayed from the user interface of the client-side of the software application based on a user interaction on the user interface of the client-side of the software application;

determining that the content displayed within the page of content has changed based on a comparison of the captured DOM to the updated user interface metadata;

in response to the determination that the content displayed within the page of content has changed, displaying a window on the user interface with a reminder message displayed therein which reminds a user to select the capture button; and responsive to receiving the user input comprising a selection of the capture button by the user, capturing updated user interface metadata of the page of content and storing an association of the events recorded after the user input with the updated user interface metadata, the updated user interface metadata comprising identifiers of user interface elements displayed within the user interface and positions of the user interface elements within the user interface.

10. The method of claim 9, wherein the DOM and the updated user interface metadata each comprise identifiers of user interface elements displayed on the user interface and positions of the user interface elements within the user interface.

11. The method of claim 9, wherein the determining that the user interface content has changed comprises detecting that a new menu has been opened on the page based on the comparison of the DOM to the updated user interface metadata.

12. The method of claim 9, wherein the determining that the user interface elements within the page of content have changed based on the comparison of the DOM to the updated user interface metadata.

13. The method of claim 9, wherein the DOM and the updated user interface metadata each comprise a DOM specification of the software application.

14. The method of claim 9, wherein the method further comprises detecting that a new capture command has been submitted, and in response, terminating the reminder message on the user interface.

15. The method of claim 9, wherein the displaying the hint message comprises displaying the window inside a recorder window of the user interface of the client-side of the software application.

16. The method of claim 15, wherein the recorder window further comprises a display of previously-recorded user interface events that have already been captured prior to determining that the user interface content has changed.

17. A method comprising:
displaying a page of content within a user interface of a client-side of a software application and a capture button;
capturing initial user interface metadata of the page of content being displayed by the user interface of the client-side of the software application, the initial user interface metadata comprising a document object model (DOM) of the page of content, and transmitting the DOM to a recorder;
activating the recorder to record events transmitted between the client-side of the software application and a server-side of the software application and storing an association of the events recorded with the initial user interface metadata, the events comprising user interface actions on the client-side, instructions sent to the server-side, and responses received from the server-side;
receiving updated user interface metadata of the page of content being displayed from the user interface of the client-side of the software application based on a user interaction on the user interface of the client-side of the software application;
determining that the content displayed within the page of content has changed based on a comparison of the captured DOM to the updated user interface metadata;
in response to the determination that the content displayed within the page of content has changed, auto-capturing the updated user interface metadata and storing an association of the events recorded after the user input with the updated user interface metadata, wherein the auto-capturing of the updated user interface metadata comprises capturing identifiers of user interface elements displayed within the user interface and positions of the user interface elements within the user interface.

18. The method of claim 17, wherein the determining that the user interface content has changed comprises detecting that a new menu has been opened on the page based on the comparison of the DOM to the updated user interface metadata.

19. The method of claim 17, wherein the determining that the user interface content has changed comprises detecting that user interface elements within the page of content have changed based on the comparison of the DOM to the updated user interface metadata.

20. The method of claim 17, wherein the DOM and the updated user interface metadata each comprise a DOM specification of the software application.

\* \* \* \* \*